United States Patent [19]

Syltebo

[11] 4,050,631

[45] Sept. 27, 1977

[54] JET ENGINE NOZZLE FOR CONTROLLING THE DIRECTION OF THRUST

[75] Inventor: Bjarne Elroy Syltebo, Bellevue, Wash.

[73] Assignee: The Boeing Company, Seattle, Wash.

[21] Appl. No.: 670,633

[22] Filed: Mar. 26, 1976

[51] Int. Cl.² .................. B64C 15/06; F02K 1/20
[52] U.S. Cl. ...................... 239/265.25; 60/230;
60/263; 115/12 R; 239/507; 244/12.5; 244/52
[58] Field of Search ............... 239/265.11, 265.19,
239/265.25, 265.27, 265.37, 265.35, 505, 507,
512, 513; 244/12.5, 23 D, 42 CC, 52, 74;
115/11, 12 R, 13-16; 60/228, 230, 263, 271

[56] References Cited

U.S. PATENT DOCUMENTS

| 2,921,435 | 1/1960 | Landgraf | 239/265.19 |
| 3,276,696 | 10/1966 | Brandt | 239/265.37 |
| 3,527,408 | 9/1970 | Markowski | 239/265.27 |
| 3,570,247 | 3/1971 | Denning et al. | 239/265.19 X |
| 3,774,868 | 11/1973 | Goetz | 239/265.19 |

FOREIGN PATENT DOCUMENTS

| 1,096,209 | 12/1960 | Germany | 239/265.19 |
| 691,302 | 5/1953 | United Kingdom | 244/74 |
| 750,621 | 6/1956 | United Kingdom | 244/74 |

*Primary Examiner*—Evon C. Blunk
*Assistant Examiner*—Andres Kashnikow
*Attorney, Agent, or Firm*—Christensen, O'Connor, Garrison & Havelka

[57] ABSTRACT

A nozzle assembly for use with a jet engine for controlling the direction of the discharged fluid and hence the direction of thrust is disclosed. The nozzle housing and an internally mounted bifurcation structure are arranged to divide the exhaust fluid flowing into a circular entrance orifice into two separate fluid streams that flow out of rectangular discharge orifices on the rear face of the nozzle. Flow deflection doors, stored within a rearwardly opening cavity formed by the bifurcation structure between the two rectangular discharge orifices, are selectively extendable into each fluid stream to modify the direction of the discharged fluid. The two flow ducts formed by the bifurcation structure and nozzle housing are configured to discharge the two fluid streams toward one another such that the fluid streams converge into a single, thrust-producing fluid stream aft of the exit orifices when the flow deflection doors are not deployed. The flow deflection doors can be asymmetrically deployed to angularly deflect the single thrust producing fluid stream for thrust vectoring, or can be symmetrically deployed to maintain the exhausted fluid streams as separate thrust producing streams that are angularly deflected away from one another for thrust reversal or thrust spoilage.

17 Claims, 7 Drawing Figures

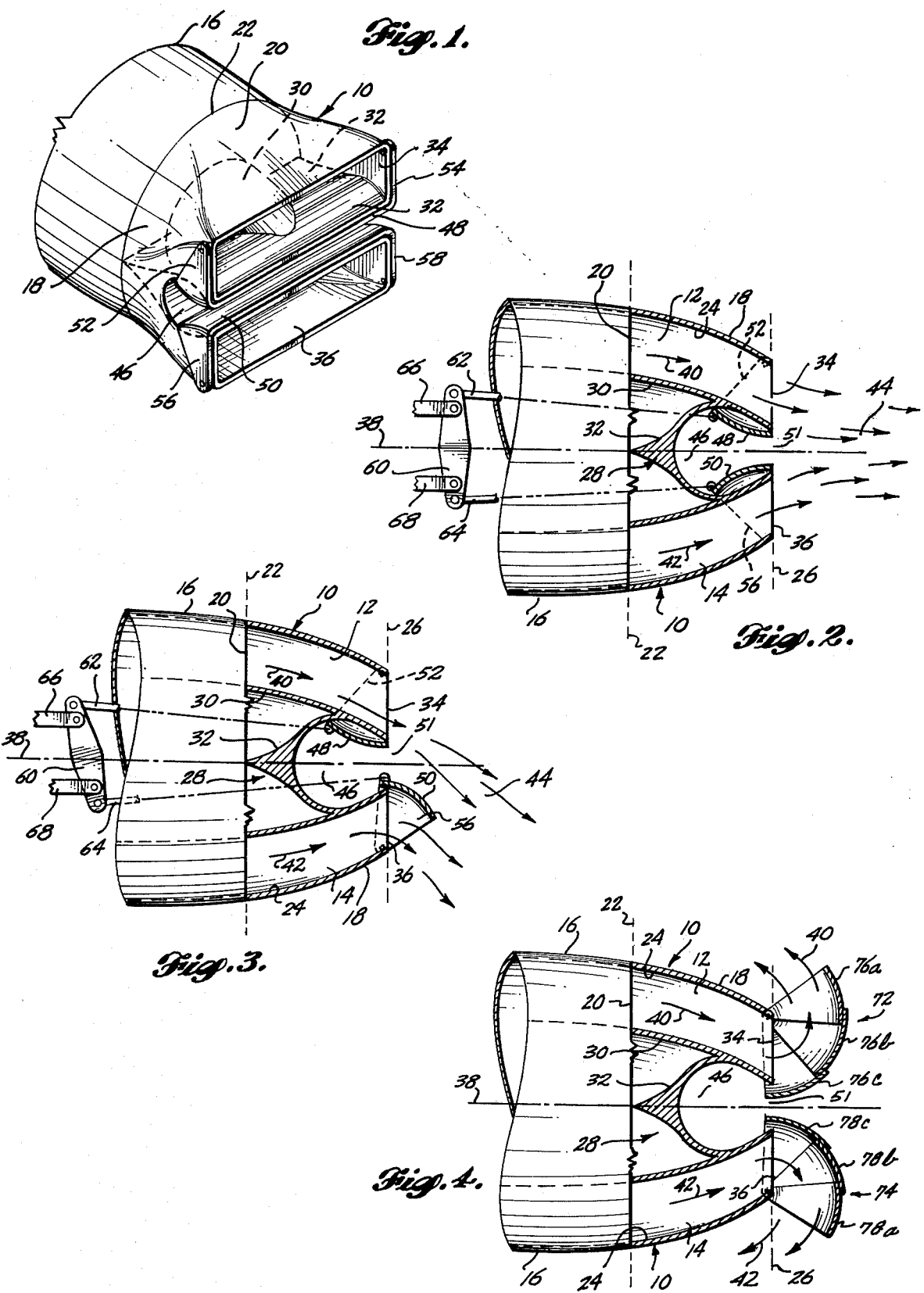

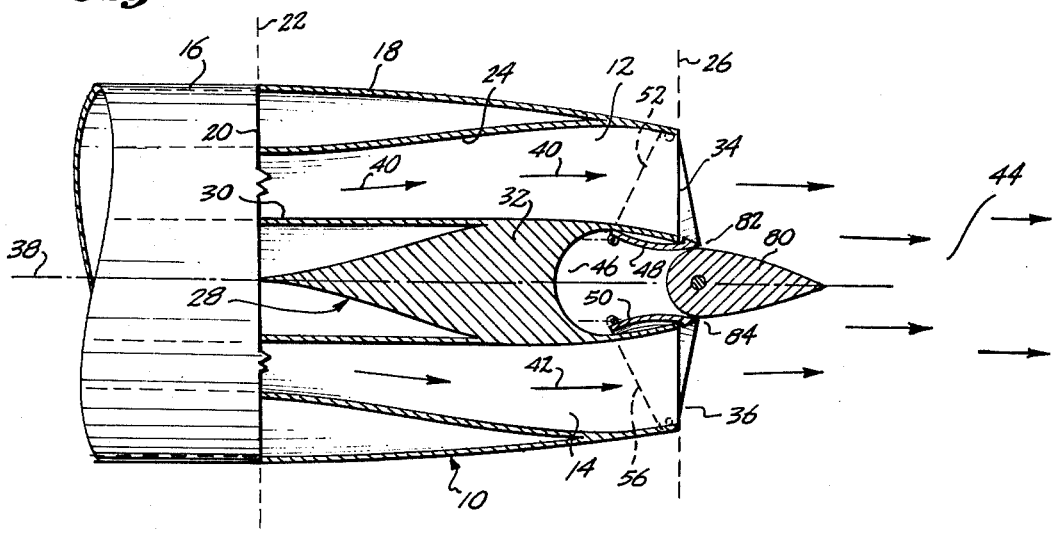
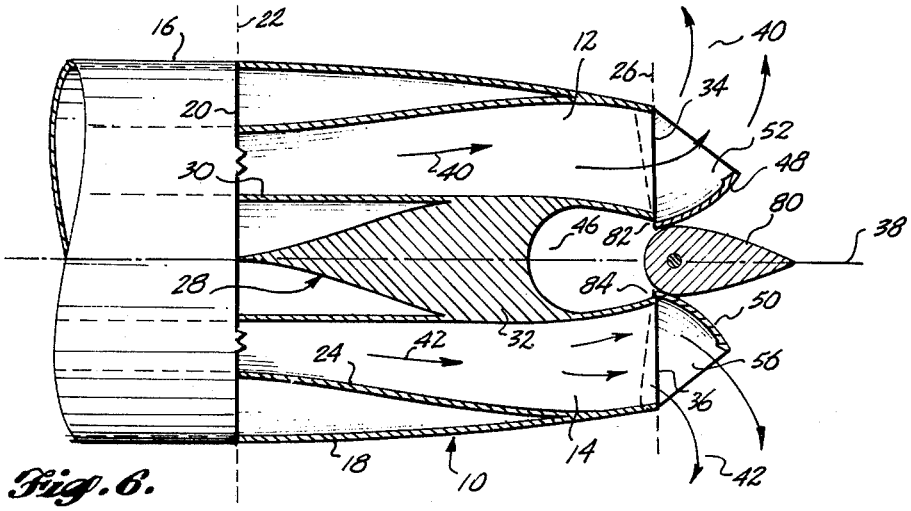
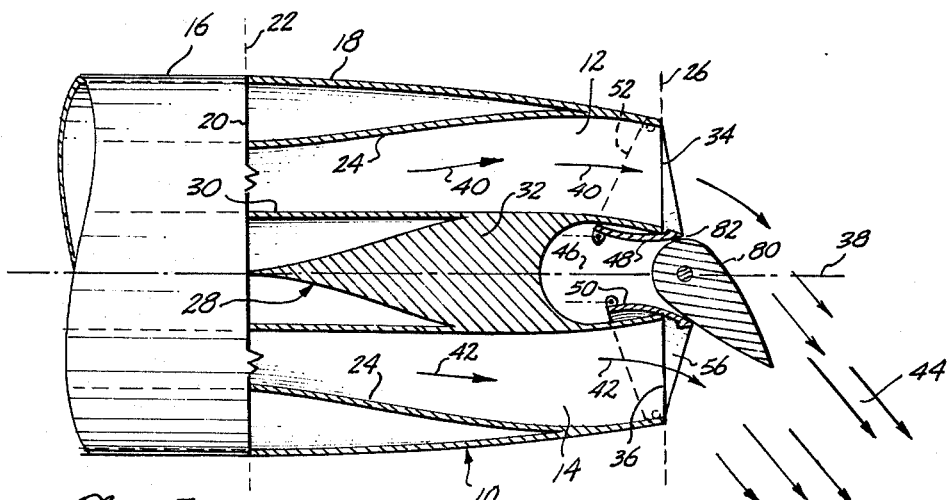

JET ENGINE NOZZLE FOR CONTROLLING THE DIRECTION OF THRUST

BACKGROUND OF THE INVENTION

This invention relates to directional control of fluids discharged from nozzles. More particularly, this invention relates to directional control of exhaust fluids discharged from a jet propulsion engine and consequently to directional control of jet engine thrust used to move vehicles of all types.

In many situations, it is desirable or necessary to directionally control the thrust supplied by a jet propulsion engine. For example, the well known thrust reversers of a jet propelled airplane redirect the exhaust fluid of the jet propulsion engines to slow down or effectively brake the airplane upon landing. Other types of control over the direction of the fluid stream supplying thrust to a jet airplane are also advantageous during both on ground and in flight procedures. During both in flight and on ground conditions, it is often advantageous to reduce the thrust without reducing the power setting of the engine. For example, during the ground taxi operation, the most advantageous engine power from the standpoint of other airplane system requirements may be inconsistent with the need for low thrust to prevent the airplane from travelling too fast. Similarly on the landing approach, the low engine speed necessary to obtain the proper approach speed and the typical delay in thrust build up that occurs when the engine power setting is advanced, often makes it difficult to accelerate the airplane for go around or emergency flight procedures. Reduction of the forward thrust component by re-directing the exhausted fluid stream to provide low forward thrust while maintaining engine speed is often termed thrust spoilage or thrust modulation. Another advantageous type of directional control over the thrust produced by a jet airplane engine is generally known as thrust vectoring. Normally, thrust vectoring apparatus permits the direction of thrust to be controlled with respect to the vertical axis. Thus, thrust vectoring can be used to shorten take-off distance or can be used for in flight maneuvering.

Although the above described aspects of controlling the direction of thrust supplied by a jet engine have been discussed in the context of jet airplanes, it will be recognized that similar requirements exist with respect to other types of vehicles propelled by jet engines, whether such vehicles travel on the ground or on or below the surface of water. Such jet propulsion engines may exhaust gases, liquids, or a combination thereof.

Generally, prior art attempts to control the direction of the fluid discharged from a jet engine, and hence the direction of the reacting thrust, include a nozzle assembly that is mounted in combination with the jet engine exhaust duct. Several thrust-controlling nozzle assemblies are known in the art, for example, U.S. Pat. No. 3,774,868, issued to G. F. Goetz; U.S. Pat. No. 3,570,247, issued to Denning et al.; and, U.S. Pat. No. 3,276,696 issued to B. K. Brandt. Each of these prior art attempts includes structure for dividing the exhausted fluid stream into two separate flow streams and in each case, directional control is obtained by the use of control panels or vanes that can be positioned to extend into each flow stream to deflect each flow stream away from the normal axial thrust direction.

In the structure disclosed by Goetz and Denning et al., the control panels form a portion of a nozzle centerbody that bifurcates the fluid flowing from the jet engine into the two separate flow streams. In the Brandt patent, the control panels are externally mounted aft of and between two adjacent exit orifices of a jet nozzle. In each of the references, the control panels are deployable to angularly deflect the two fluid streams that are exhausted from the nozzle away from one another to control the direction of thrust.

One drawback of the above prior art structure is that thrust vectoring is obtained by deflecting one of the two flow streams while the second flow stream is not deflected. Thus, only a limited upward or downward thrust component can be established. Secondly, rather complex actuation mechanism is required to deploy the deflection control panels. In addition, with respect to nozzles in which the control panels form a portion of the surface of the centerbody, the deflection control panels must be precisely dimensioned so as to form an aerodynamically smooth surface when the panels are retracted.

Accordingly, it is an object of this invention to provide a jet engine nozzle with directional control over the exited flow stream for thrust reversal, thrust spoilage and thrust vectoring.

It is yet another object of this invention to provide a jet engine nozzle in which the entire exited flow stream can be angularly deflected to supply improved thrust vectoring capability.

It is still another object of this invention to provide a jet engine nozzle that includes deflection control panels that can be deployed by relatively simple mechanical means.

SUMMARY OF THE INVENTION

These and other objects are achieved in accordance with this invention by a nozzle assembly including an outer housing and a bifurcation structure that are arranged to divide the fluid flow into two separate fluid streams. In the preferred embodiment, the outer nozzle housing includes a generally circular entrance opening for receiving fluid flow from a jet engine and a generally rectangular exit opening. The interior walls of the outer housing are contoured to form an aerodynamically smooth transition between the entrance and exit orifices. The bifurcation member includes a generally conical plug that is concentrically mounted with respect to the outer housing entrance opening with the cross section of the plug often decreasing relative to the direction of fluid flow. A transverse bifurcation member, mounted between opposite walls of the outer housing, divides the fluid flow and partitions the outer housing exit orifice into two generally rectangular discharge orifices. The transverse bifurcation member is configured to form a rearwardly opening cavity between the two rectangular discharge orifices that is utilized for stowage of deflection vanes or doors. The surface of the bifurcation member and the interior wall of the outer housing are configured to form two exhaust passageways that discharge the two fluid streams through the discharge orifices and toward one another at a predetermined angle relative to the axial centerline of the nozzle. The discharge of the fluid streams toward one another causes the two fluid streams to converge into a single thrust producing fluid stream at a point aft of the discharge orifices. The interaction of the two converging fluid streams directs the single thrust producing flow stream rearwardly from the nozzle in a direction substantially perpendicular to the exit orifices.

Flow deflection of each fluid stream is effected by a deflection door that is extendable from within the bifurcation member cavity into each flow stream at a point just aft of the discharge orifices. Each deflection door is rotatable about an axis substantially coincidental with an outer edge of the associated rectangular discharge orifice and the deflection doors can be symmetrically extended or asymmetrically extended to establish various flow patterns or thrust configurations. Generally, to provide thrust vectoring, a single deflection door is deployed to deflect one of the fluid streams away from the other. Since the undeflected fluid stream is angularly discharged toward the axial centerline of the nozzle, the undeflected fluid stream joins with the deflected fluid stream so that a single angularly deflected fluid stream is maintained.

BRIEF DESCRIPTION OF THE DRAWINGS

FIG. 1 is an isometric view of an embodiment of the jet engine nozzle of this invention;

FIG. 2 is a longitudinal view in partial section of the embodiment of this invention depicted in FIG. 1;

FIG. 3 is a longitudinal view in partial section of the embodiment of this invention depicted in FIGS. 1 and 2 illustrating thrust vectoring operation;

FIG. 4 is a longitudinal view in partial section of a second embodiment of this invention that includes serially deployable deflector vanes;

FIG. 5 is a longitudinal view in partial section of another embodiment of this invention;

FIG. 6 is a longitudinal view in partial section of the embodiment of FIG. 5 illustrating thrust modulation operation; and FIG. 7 is a longitudinal view in partial section of the embodiment of FIG. 5 illustrating thrust vectoring operation.

DETAILED DESCRIPTION

The nozzle depicted in FIG. 1 can be employed with any of a number of jet propulsion engines, such as a turbojet engine or a turbofan jet propulsion engine either with the turbine exhaust nozzle, or with a mixed flow nozzle that combines the fluid stream or exhaust effluent from the fan and the turbine. In general, the nozzle illustration is simplified for ease of drafting and explanation. The nozzle 10 includes an outer housing 18 defining an exhaust flow duct having an entrance orifice 20. A bifurcation structure 28 divides the aft portion of the exhaust flow duct into upper and lower duct passageways 12 and 14 that terminate in upper and lower discharge orifices 34 and 36. The bifurcation structure 28 defines a cavity 46 that opens rearwardly between the upper and lower discharge orifices 34 and 36. Deflection doors 48 and 50 are stowed within the cavity 46 when not in operation and are independently movable to be interposed in the fluid streams 40 and 42 that are directed rearwardly from the upper and lower discharge orifices 34 and 36. The deflection doors 48 and 50 are selectively and independently movable for interposition in the fluid streams 40 and 42 so that one or both of the fluid streams can be deflected away from the other to reorient the resulting thrust vector in a different direction.

For ease of description, the nozzle 10 will be described as being constructed about its axial center line 38, which center line is a rearward extension of the center line of the jet propulsion engine 16 to which the nozzle 10 is attached. The entrance orifice 20 to the nozzle is generally circular in configuration and defines an entrance plane 22 oriented orthogonally to the nozzle center line 38. The housing 18 is depicted as being formed from a single wall 24, although it will be apparent to those of ordinary skill in the art that nozzle structures normally employ inner and outer walls interconnected by appropriate spacers and structural members. The housing wall 24 extends rearwardly from the entrance orifice 20 in a generally annular configuration to the rearward edge, which defines a nozzle exit plane 26 oriented orthogonally to the nozzle axial center line 38. When viewed from the rear, the rearward edge of the housing 18 is generally rectangular in configuration. The wall 24 of the nozzle 10 smoothly transits from the circular entrance orifice 20 to the rectangular rearward edge, forming a smooth, aerodynamically clean shape, both on the interior surface defining the duct and the exterior surface of the nozzle.

The bifurcation structure 28 is positioned about midway between the upper and lower portions of the rear edge of the nozzle 10 forming upper and lower discharge orifices 34 and 36 that are generally rectangular and elongated in the transverse dimension. The bifurcation structure 28 has a rather complex aerodynamic geometry, but basically consists of a nozzle plug 30 and a transverse bifurcation member 32 that extends diametrically across the nozzle adjacent the discharge orifices 34 and 36. The forward end of the nozzle plug 30 terminates in a generally circular edge that is positioned in the entrance plane 22 and that is designed and constructed to fit the required plug geometry for a given jet propulsion engine. One or ordinary skill in the art will realize that, depending upon the particular internal configuration of a jet propulsion engine, a nozzle plug 30 may or may not be necessary, and therefore, the plug 30 itself forms no necessary part of the present invention. The transverse bifurcation member 32 is oriented horizontally so that it intersects the nozzle center line 38 and extends between opposite sides of the outer housing wall 24. The forward end of the transverse bifurcation member 32 forms a relatively sharp leading edge that orthogonally intersects the nozzle center line 38. From the leading edge, the upper and lower walls that form the transverse bifurcation member 32 diverge in smooth, vertically extending curves, first of increasing slope and then of decreasing slope. At about the longitudinal center portion of the bifurcation member 32, the upper and lower walls begin to converge and terminate in vertically spaced, parallel, rearward edges at the exit plane of the nozzle, thus forming in conjunction with the side wall portions of the outer housing wall 24 a rectangular, rearwardly facing opening 51 positioned between the upper and lower discharge orifices 34 and 36. The space between the upper and lower walls of the transverse bifurcation member 32 form a forwardly extending cavity 46 for stowing the deflection doors 48 and 50. The nozzle plug 30, which in this embodiment forms part of the bifurcation member 28, is generally of frustoconical configuration and is oriented coaxially with the nozzle center line 38. As the walls of the transverse bifurcation member 32 extend inwardly from the sides of the housing wall, they merge into the wall of the nozzle plug 30 on both sides of the nozzle center line 38.

In use, exhaust fluid expelled from the jet propulsion engine enters the nozzle structure of the present invention through its entrance orifice 20. As the fluid stream flows through the duct, it is split into upper and lower fluid streams 40 and 42 as it passes the leading edge of the bifurcation member 28. The converging widening geometry of the aft portions of the outer housing wall 24 and the converging geometry of the aft portion of the bifurcation member 28 causes each of the fluid streams 40 and 42 to be flattened out into a flow pattern of generally rectangular cross section and directs each of the fluid streams 40 and 42 at an acute angle toward the nozzle axial center line 38. As the fluid streams 40 and 42 exit from the upper and lower discharge orifices 32 and 34, they impinge upon each other aft of the nozzle exit plane 26 along a rearward extension of the axial center line 38 and combine with each other to form a single fluid stream 44. The dynamic interaction of the two impinging fluid streams causes the combined stream 44 to be re-directed rearwardly from the nozzle 10 in a direction generally parallel to the nozzle center line 38.

The deflection doors 48 and 50 are sized to fit within the rearwardly opening cavity 46 in the bifurcation member 28. The deflection doors are generally rectangular, have their longitudinal dimension oriented transversely to the nozzle 10, and extend from adjacent one side wall to the cavity to adjacent the opposing side wall. The deflection doors 48 and 50 are of an arcuate shape with respect to their longitudinal dimension, i.e. that dimension oriented generally in the same direction as the axial center line 38 of the nozzle 10 when the doors are stowed, with their convex surface oriented inwardly toward the center line 38 of the nozzle 10. Deflection door 48 is positioned above the center line 38 of the nozzle 10 while the deflection door 50 is positioned below the center line 38 of the nozzle 10. When the deflection doors are stowed, the forward edges of each deflection door is adjacent the forward portion of the cavity 46 while the rearward edges of each deflection door 48 and 50 is respectively positioned adjacent the upper and lower edges of the rearward facing 51 formed by the bifurcation member 28.

The upper and lower deflection doors are each mounted for swinging movement from their stowed position to their extended position by a pair of upper flanges 52 and 54 and a pair of lower flanges 56 and 58 that are affixed to and extend upwardly and downwardly, respectively, from the ends of the upper and lower deflection doors. As depicted in the simplified view, the upper ends of the upper flanges 52 and 54 are pivotally mounted on suitable pins positioned respectively at the upper corners of the upper rectangular discharge orifice 34. In actual practice, the side wall 24 of the housing 18 will usually consist of an inner wall and an outer wall. The flanges (52-58) are then positioned between the inner and outer walls so as to remove the flanges from both the fluid stream on the interior of the nozzle and the ambient air flowing past the exterior of the nozzle.

Deflection doors 48 and 50 are deployed by a bell crank 60, two connecting arms 62 and 64, and two actuation rods 66 and 68. This bell crank assembly can be conveniently mounted within the engine housing or cowl structure (not shown in FIG. 2) with either a single pair of connecting arms, a single pair of actuation rods, and a single bell crank employed, or, alternatively, a bell crank, connecting arms, and actuation rods can be connected at each end of the deflection doors 48 and 50. In addition, various other conventional linkage can be employed to actuate deflection doors 48 and 50.

Regardless of the exact configuration, it can be seen that in the arrangement of FIGS. 2 and 3, the connecting rods 62 and 64 are pivotably connected to the outer extremities of the bell crank 60. The actuation rod 66 is pivotably connected to the bell crank 60 at a point that is near the outer extremity of the bell crank and the actuation rod 68 is pivotably connected outwardly of the center of bell crank 60. Examining the structure, it can be recognized that longitudinal translation of the actuation rods 66 and 68 can deploy either or both of the deflection doors 48 and 50 by any desired amount between the stowed position and the fully extended position. For example, in FIG. 3 which illustrates the deployment of deflection door 50 to produce an upward thrust vector, both the actuation rods 66 and 68 are longitudinally translated with the rod 68 travelling a greater distance than the rod 66 to effectively cause the bell crank 60 to rotate about the pivotable connection between the bell crank 60 and the connecting rod 62. The longitudinal deflection of the actuation rods 66 and 68 may be effected by any number of conventional electrically or hydraulically actuated systems.

It should be noted that during the thrust vectoring mode of operation such as depicted in FIG. 3, a single thrust producing stream 44 is maintained. That is, when the fluid stream 42, flowing from discharge orifice 36 is deflected downward, the fluid streams 40 and 42 merge into a single fluid stream 44 that produces both a forward and an upward thrust component. It should be recognized that two factors influence the merging of the fluid stream 40 with the fluid stream 42 to form the single deflected thrust producing fluid stream 44. First, as previously noted, the passageways 12 and 14 are configured to discharge fluid streams 40 and 42 toward the axial center line 38. Thus, as one fluid stream is deflected away from the axial center line by a deflection door, the second fluid stream tends to assume the angle of discharge dictated by the particular geometry employed and the fluid streams merge at a point aft of the extended deflection door. Secondly, the extended deflection door not only controls the fluid stream directly impinging on the deflection door, but also deflects the second fluid stream as well. For example, in FIG. 3, full deployment of the deflection door 50 deflects the fluid stream 40 as well as the fluid stream 42. This deflection of fluid stream 40 arises from a phenomena of fluid dynamics commonly called the Coanda effect in which fluid flowing along a surface tends to follow a path that is a projection of the surface after flowing past the terminating edge of the surface. Thus with respect to FIG. 3, the fluid stream 40 flows along the aft surface of the deflection door 50 and, if the deflection door 50 is extended so that the trailing edge of the deflection door 50 forms an angle greater than the angle at which the fluid stream 40 is discharged from discharge orifice 34, the fluid stream 40 is deflected beyond its normal exit angle.

In view of the foregoing, it can be realized that in contrast with the prior art nozzles in which only one of the two exhausted fluid streams is vertically deflected during thrust vectoring operation, the practice of this invention provides a greater thrust vectoring range than has hitherto been available since the entire fluid stream is deflected. Further since the entire fluid stream is deflected, a greater amount of thrust vectoring for a particular deflection of the fluid stream is achieved. This feature results in more rapid thrust vectoring control since a relatively small displacement of the deflection doors supplies a desired thrust component.

Examining the embodiment of the invention depicted in FIG. 3, it can be recognized that various realizations of the invention will be configured to provide various thrust vectoring capabilities. Specifically, the ratio of the nozzle axial length to the nozzle diameter and the angle at which fluid streams 40 and 42 are discharged toward axial center line 38 can be controlled to determine the thrust vectoring capabilities. For example, in utilizing the jet nozzle of this invention with a conventional aircraft jet engine to provide short take off capabilities, the ratio of the axial length to diameter of nozzle 10 and the contour of passageways 12 and 14 can be configured to provide as much as ±30° of thrust deflection while maintaining a single thrust producing fluid stream 44. Accordingly, it can be recognized that in airplane installations in which the axial center line of the engine and jet nozzle is inclined 15° below the direction of forward airplane travel a selectable thrust deflection between 45° of upward thrust and 15° of downward thrust can be realized. It will be apparent to those skilled in the art that such an arrangement can also be utilized to produce either yaw control or vertical take-off and landing (VTOL) capability by suitably orienting the jet propulsion engine and exhaust nozzle. For example, in a VTOL aircraft, if the jet propulsion engine is mounted at an angle with respect to the vertical aircraft axis, the nozzle of this invention can provide thrust in the forward, directly upward and rearward directions.

Referring again to FIG. 3, it can be seen that translation of the actuation rods 66 and 68 by equal amounts will symmetrically deploy the deflection doors 48 and 50 into the fluid streams 40 and 42. Such symmetrical deployment effects thrust modulation or thrust spoilage in that the forward thrust component is reduced by deflecting both the fluid streams 40 and 42 away from axial center line 38. Often in the thrust spoilage operating mode, the fluid streams 40 and 42 will be deflected such that the fluid streams do not merge into a single thrust producing fluid stream, but remain as separate fluid streams with a total forward thrust component equal to the vector sum of the forward thrust components produced by the fluid streams 40 and 42. As previously mentioned, thrust spoilage operation can be advantageous employed in many in flight and on ground procedures in which it is necessary or desirable to maintain relatively high engine power with reduced forward thrust.

Thrust reversal is also achieved in accordance with this invention by symmetric deployment of deflection doors 48 and 50 with the deflection doors extended so as to reverse the direction of each fluid stream. An embodiment of this invention particularly suited for a full thrust reversal operation is depicted in FIG. 4.

Like the embodiment of FIG. 2 and 3, the embodiment of FIG. 4 includes an outer housing 18 and a bifurcation member 28 configured to form two passageways 12 and 14 that discharge two fluid streams 40 and 42 toward axial center line 38. The embodiment of FIG. 4 differs from the embodiment of FIGS. 2 and 3 primarily in that the deflection of fluid streams 40 and 42 is effected by deflection doors 72 and 74 each of which include serially deployable deflection panels 76a, 76b, and 76c. These deflection panels are serially activated as the deflection doors are extended into the fluid stream, that is, deflection panel 76a is first deployed into the fluid stream, followed by deflection panel 76b, etc. with the deflection panels being retracted in a reverse order. Doors 72 and 74 are stowed within cavity 46 in the same manner as deflection doors 48 and 50 of the embodiment depicted in FIGS. 1–3.

Each deflection panel 76a, 76b, and 76c is an arcuate shaped panel similar to the deflection doors 48 and 50 of FIG. 3 with each deflection panel including a flange along each outward edge similar to flanges 52–58 of the embodiment depicted in FIG. 1–3. The flanges and the deflection doors 72 and 74 are arranged such that the flanges and deflection panels 76 nest with one another within cavity 46 of the bifurcation member 28 when the deflection doors 72 and 74 are retracted. In the extended position, adjacent edges of the deflection panels and the flanges overlap one another to form a substantially continuous arcuate deflection surface that is closed off along the outside edges of the nozzle by the flanges. The number of deflection panels desirable or necessary in each realization of the embodiment of FIG. 4 is determined by the dimensions of the bifurcation member cavity 46 and by the arcuate deflection surface necessary to effect thrust reversal. It should be understood that the embodiment of FIG. 4 operates in the same manner at the embodiment of FIGS. 1, 2 and 3, in that the deflection doors 72 and 74 can also be asymmetrically deployed into the fluid stream 40 and the fluid stream 42 to effect thrust vectoring operation.

FIGS. 5, 6 and 7 depict another embodiment of this invention that is particularly suited for utilization on a jet propelled airplane configured primarily for long range missions. Like the previously described embodiments, this embodiment includes an outer housing 18 and a bifurcation member 28 that are arranged to divide the exhausted jet engine fluid stream into two separate fluid streams 40 and 42 with the bifurcation member 28 providing a cavity 46 for stowage of the deflection doors 48 and 50. The axial length of the embodiment of FIG. 5 is generally greater than that of the previously described embodiments with the bifurcation member 28 being more elongate than the bifurcation members of the previously described embodiments. This increased length provides aerodynamic characteristics most suited for a long range or cruise configuration of the jet nozzle of this invention. Further in such a cruise embodiment, the passageways 12 and 14 are generally configured to discharge the fluid streams 40 and 42 at a relatively shallow angle with respect to the axial center line 38. This angular relationship effects maximum engine thrust during periods of operation in which the fluid streams 40 and 42 are not deflected. It should be noted the increased length of this embodiment and the noted contouring of the passageways 12 and 14 demonstrate the previously described control of the nozzle dimensional parameters to realize an embodiment of this invention for a particular application.

In the embodiment of FIG. 5, a trailing body 80, which is a wing shaped, cambered airfoil of length commensurate with deflection doors 48 and 50, is mounted transversely to axial center line 38 in the rectangular opening of the bifurcation member 28. The forward edge of trailing body 80 is substantially coincident with the exit plane 26, with the trailing body 80 extending axially from the rear of nozzle 10. The trailing body 80 effectively forms an aerodynamic extension of the bifurcation member 28 and is mounted to be pivotable about an axis transverse to the axial center line 38 at a point just aft of the exit plane 26. An upper slot 82 is formed between the upper forward surface of the trailing body 80 and the lower edge of the discharge orifice 34 for the deployment of the deflection door 48 and a lower slot 84 is formed between the lower forward surface of the trailing body 80 and the upper edge of discharge orifice 36 for the deployment of the deflection door 50.

As depicted in FIGS. 5, 6, and 7, the trailing body 80 and the deflection doors 48 and 50 are operated in cooperation with one another to provide thrust reversal, thrust spoilage and thrust vectoring. Specifically, FIG. 5 illustrates the structural arrangement during operational periods in which the fluid streams 40 and 42 are not deflected, FIG. 6 illustrates thrust reversal or thrust spoilage operation and FIG. 7 illustrates thrust vectoring operation. When the fluid streams 40 and 42 are not deflected (FIG. 5), the nozzle structure forms a generally elongated bifurcated fluid flow duct that is aerodynamically contoured to produce a single thrust producing stream 44 behind the discharge orifices 34 and 36. During the thrust reversal or thrust spoilage operational modes (FIG. 6), the trailing body 80 is maintained substantially centered about axial centerline 38 and deflection doors 48 and 50 are respectively deployed through the upper slot 82 and the lower slot 84 to deflect the fluid streams 40 and 42 in the same manner as was described with respect to the embodiment of FIGS. 1-4. During thrust vectoring operations (FIG. 7), the deflection doors 48 and 50 are asymmetrically deployed as previously described, and, in addition, the trailing body 80 is rotated about its mounting axis to effectively form an extension of the extended deflection doors. For example, in the upward thrust vectoring situation depicted in FIG. 7, the trailing body 80 is rotated so that the lower surface of the trailing body 80 continues to direct or deflect the fluid stream 42 as the fluid stream flows past the terminating edge of deflection door 50 and the upper surface of the trailing body 80 continues to direct fluid stream 40, primarily by Coanda effect, as the fluid stream 40 flows past the terminating edge of the deflection door 48. Accordingly, it can be recognized that the trailing body 80 provides a greater range of thrust deflection than would otherwise be available from the deployment of deflection doors 48 and 50. The additional thrust deflection range provided by the trailing body 80 is especially advantageous in embodiments of this invention configured for cruise or long range missions since, as previously described, such embodiments normally have a relatively low nozzle diameter to nozzle axial length ratio with the passageways 12 and 14 configured to discharge the fluid streams 40 and 42 at a relatively shallow angle with respect to the axial center line 38. Accordingly, in such embodiments additional deflection means such as the serially deployable deflection doors of FIG. 4 or the trailing body 80 of FIG. 8 are often necesssary to deflect fluid streams 40 and 42 beyond the discharge angle inherently available by the configuration of passageways 12 and 14.

Since the disclosed embodiments are exemplary in nature, many variations are possible without exceeding the scope and spirit of this invention as defined by the appended claims. First, although the invention is described in the context of its application to jet aircraft engines, it can be recognized that the invention is equally applicable to the jet engines of virtually all jet propelled vehicles e.g. vehicles propelled over the surface of land or vehicles propelled either on the surface of below the surface of a body of water. Secondly, in an embodiment of the invention configured to provide thrust vectoring in a single direction, e.g. upward thrust vectoring for decreasing the take off distance of a jet propelled airplane a single deflection door (which may or may not include a number of serially deployable deflection panels) can be utilized. Further, although the discharge orifices 34 and 36 are described herein as being generally rectangular in shape, outer housing 18 can be configured such that generally crescent shaped discharge orifices are formed i.e., rather than outer housing 18 having a rectangular opening in exit plane 26, the opening can be of a generally oblong geometry. In any case, it should be recognized that a jet nozzle in accordance with this invention includes an outer housing, a bifurcation member, and one or more deflection doors in which the outer housing and bifurcation member are configured to divide the fluid stream into two separate fluid streams that are directed toward one another upon discharge with the deflection doors stowable in a cavity within the bifurcation member and deployable into one or both of the discharge fluid streams.

What is claimed is:

1. A jet nozzle for use with a jet propulsion engine for controlling the direction of the fluid discharged therefrom relative to a reference line extending rearwardly from said jet nozzle comprising:

outer housing means defining a fluid flow duct for rearwardly directing the fluid discharged by said jet engine, said outer housing means having an entrance orifice and an exit orifice;

bifurcation means mounted within said fluid flow duct for dividing said fluid flowing through said duct into first and second thrust producing fluid streams, said bifurcation means dividing said exit orifice into first and second spaced apart discharge orifices for respectively discharging said first and second fluid streams in a rearward direction, said bifurcation means defining a rearwardly opening cavity between said first and second discharge orifices, said duct in said housing means and said bifurcation means being so constructed and associated with one another to discharge said first and second fluid streams inwardly toward said reference line for impingement of said inwardly directed first and second fluid streams on each other at a location rearward of said discharge orifices, the interaction between said impinging first and second fluid streams re-directing said first and second fluid streams as a single rearwardly directed fluid stream that is substantially symmetrical about said reference line; and deflection means operable in a thrust vectoring mode of operation for angularly disposing said single thrust producing fluid stream relative to said rearwardly extending reference line, said deflection means operable from a stowed position within said rearwardly opening cavity of said bifurcation means to at least one deployed position wherein said deflection means extends into and intercepts at least one of said first and second fluid streams, each of said deployed position of said thrust vectoring mode redirecting the intercepted first and second fluid streams outwardly and away from said reference line for mergence with one another at a position rearward of said discharge orifices and outward of said reference line to form a single thrust producing fluid stream angularly disposed relative to said reference line.

2. The jet nozzle of claim 1 wherein said deflection means is further operable in a thrust spoilage mode of operation, said deflection means being extendable from said rearwardly opening cavity of said bifurcation means to at least one position wherein said deflection means extends into and intercepts both of said first and second fluid streams, each of said deployed positions of said thrust spoilage mode redirecting each of said first and second fluid streams outwardly and away from said reference line to prevent said mergence said first and second fluid stream into said single thrust producing fluid stream.

3. The jet nozzle of claim 2, wherein said deflection means comprises:
 a first deflection door and means for mounting said first deflection door for movement between a stowed positioned in the cavity in said bifurcation means and each deployed position wherein said first deflection door is interposed in said first fluid stream so as to divert said first fluid stream away from said reference line;
 a second deflection door and means for mounting said second deflection door for movement between a first position wherein said second deflection door is stowed in the cavity in said bifurcation means and each deployed position wherein said second deflection door is interposed in said second fluid stream to divert said second fluid stream away from said reference line, and
 actuation means for independently moving said first and second deflection doors between their respective first and extended positions when said deflection means is operated in said thrust vectoring mode and for moving said first and second deflection doors in unison when said deflection means is operated in said thrust spoilage mode.

4. A jet engine nozzle for use in combination with a jet engine for controlling the direction of fluid discharged therefrom comprising:
 outer housing means for directing the fluid flow discharged by said jet engine, said outer housing means having an entrance orifice and an exit orifice, said outer housing means being substantially symmetrical about a rearwardly extending axial centerline;
 bifurcation means substantially symmetrical about said axial centerline for dividing said fluid flow into first and second fluid streams, said bifurcation means being so configured and so associated with said outer housing means so as to divide said outer housing exit orifice into first and second discharge orifices, said bifurcation means including a rear terminus and including an interior cavity having an opening in said rear terminus extending between said first and second discharge orifices, said bifurcation means and said outer housing means being further configured and arranged to exit each of said first and second fluid streams from said first and second discharge orifices inwardly toward said axial centerline at a predetermined angle relative to said axial centerline for convergence into a single thrust producing fluid stream at a point aft of said discharge orifices relative to the flow direction of said first and second fluid streams, said single thrust producing fluid stream flowing rearwardly and being substantially symmetrical about said axial centerline when each of said first and second fluid streams are discharged from said first and second discharge orifices at said predetermined angle;
 thrust deflection means for modifying the direction of said first and second fluid streams, said thrust deflection means stowable within said interior cavity of said bifurcation means, said thrust deflection means asymmetrically deployable through said opening of said cavity to extend into at least one of said first and second fluid streams in the region aft of said first and second discharge orifices for deflecting at least one of said first and second fluid streams outwardly from said axial centerline, each of said outwardly deflected first and second fluid streams merging with the other one of said first and second fluid streams to angularly deflect said single thrust producing fluid stream relative to said axial centerline, said thrust deflection means symmetrically deployable to extend into said first and second fluid streams in the region aft of said first and second discharge orifices to outwardly deflect both of said first and second fluid streams away from said axial centerline to maintain each of said first and second fluid streams as separate fluid streams and prevent the establishment of said single thrust producing stream.

5. The jet engine nozzle of claim 4 further comprising trailing body means pivotably mounted between said first and second discharge orifices, said trailing body means extending rearwardly from said first and second discharge orifices and having an aerodynamically contoured surface, said trailing body means so configured and so arranged relative to said thrust deflection means so as to further deflect said first and second fluid streams during periods of operation in which said thrust deflection means are asymmetrically deployed.

6. A nozzle for use with a jet propulsion engine for controlling the direction of fluid discharge from said nozzle comprising:
 an outer housing for directing the fluid discharged from said jet engine, said outer housing having a generally circular entrance orifice and a remotely located generally rectangular exit orifice, said outer housing including an interior wall contoured to form an aerodynamic flow duct between said entrance orifice and said exit orifice;
 bifurcation means for dividing the fluid flowing through said outer housing into first and second thrust producing fluid streams, said bifurcation means including a first member mounted transversely between opposite wall surfaces of said outer housing to divide said rectangular exit orifice into first and second generally rectangular discharge orifices for respectively discharging said first and second fluid streams, said first member forming a transverse cavity between said first and second discharge orifices, said first member and said outer housing so arranged and so configured as to discharge said first and second fluid streams rearwardly from said nozzle and inwardly toward one another for impingement with one another at a predetermined distance behind said first and second discharge orifices to redirect said first and second fluid streams as a single thrust producing fluid stream having a substantially rearward direction of flow;
 first and second deflection doors, for angularly deflecting said single thrust producing fluid stream from said substantially rearward direction of flow, said first and second deflection doors retractable within said transverse cavity, said first deflection door deployable to deflect said first fluid stream angularly away from said inwardly directed second fluid stream, said angular deflection of said first fluid stream being established for mergence of said deflected first fluid stream with said inwardly directed second fluid stream to angularly redirect said single thrust producing fluid stream relative to said substantially rearward direction, said second deflection door deployable to angularly deflect said second fluid stream away from said inwardly directed first fluid stream, to said angular deflection of said second fluid stream being established for mergence of said deflected second fluid stream with said inwardly directed first fluid stream to angularly redirect said single thrust producing fluid stream relative to said substantially rearward direction; and actuator means for deploying said first and second deflection doors, said actuator means including means for individually and differentially deploying said first and second deflection doors to redirect said single thrust producing fluid stream at selected angles relative to said rearward direction.

7. The jet engine nozzle of claim 6, wherein said actuator means further includes means for extending both of said first and second deflection doors into said first and second exited fluid streams by a substantially equal amount for angularly deflecting both of said first and second fluid streams away from one another to maintain said first and second fluid streams as separate redirected fluid streams.

8. The jet engine nozzle of claim 7, wherein said bifurcation means further includes a plug concentrically mounted within said circular opening of said outer housing, said plug having a generally circular cross section dimensions to control said first and second fluid streams as said first and second fluid streams flow through said aerodynamic flow duct, the rearmost portion of said plug being recessed to intersect with said first bifurcation member.

9. The jet engine nozzle of claim 8, wherein each of said first and second deflection doors is an arcuate panel of a length substantially identical to the length of said first bifurcation member, the chordal length of said arcuate panel being dimensioned such that said arcuate panel is fully retractable within said transverse cavity of said first bifurcation member.

10. The jet engine nozzle of claim 9 further comprising a trailing body having a wing-like cross-sectional geometry, said trailing body of a length generally commensurate with the length of said deflection doors, the first edge of said trailing body pivotably mounted within the opening of said transverse cavity with said trailing body extending rearwardly from said first and second discharge orifices, said trailing body extending along the axial centerline of said jet nozzle during periods of operation in which said deflection doors are extended into said first and second fluid streams by a substantially equal amount, said trailing body pivotable such that one surface of said trailing body is substantially parallel to the terminating portion of that one of said first and second deflection doors extended the greatest distance during periods of operation in which said first and second deflection doors are respectively extended by said first and second predetermined distances.

11. The jet engine nozzle of claim 9, wherein said first and second deflection doors include a series of panels, the panels of said first and second deflection doors being nested one upon the other when said first and second deflection doors are retracted within said transverse cavity, said series of panels of said first and second deflection doors being serially deployable to deflect said first and second fluid streams.

12. A jet engine nozzle for use in combination with a jet engine comprising:

outer housing means for directing the fluid discharge of said jet engine, said outer housing means having an entrance plane including a circular opening therein for receiving the fluid discharge from said jet engine, said outer housing means having an exit plane including an exit opening of generally rectangular geometry, the interior wall of said outer housing contoured to form an aerodynamically smooth fluid flow duct between said circular opening of said entrance plane and said rectangular opening of said exit plane;

bifurcation means for dividing said fluid flow duct into first and second fluid passageways, said bifurcation means including a generally tubular cross member mounted transversely between substantially diametrically opposed points on said interior wall of said outer housing means, said tubular cross member intersecting with said exit plane with the wall of said tubular cross member terminated at said exit plane to divide said rectangular exit opening into first and second rectangular discharge orifices for said first and second fluid passageways, the outer surface of said tubular cross member and that portion of said interior wall of said housing means that forms opposing surfaces of said first and second fluid passageways contoured to direct the first and second fluid streams respectively flowing through said first and second discharge orifices toward one another so that said first and second fluid streams merge into a single thrust producing fluid stream after being discharged from said first and second discharge orifices;

flow deflection means for deployment in said first and second fluid streams to control the direction of fluid discharge from said jet engine nozzle, said flow deflection means retractable within the interior region of said tubular cross member during periods of operation in which said directional control is not executed, said flow deflection means extendable through the rectangular opening formed by the intersection of said tubular cross member with said exit plane for deflecting said fluid discharged from said first and second rectangular discharge orifices; and control means for deploying said flow deflection means.

13. The jet engine nozzle of claim 12 wherein said flow deflection means includes first and second deflection doors, said first deflection door extendable into said first fluid flow stream directly behind said first rectangular exit orifice to deflect said first fluid flow stream, said second deflection door extendable into said second fluid flow stream directly behind said second rectangular discharge orifice to deflect said second fluid flow stream.

14. The jet engine nozzle of claim 13, wherein said control means includes means for differentially controlling the incremental extension of said first and second deflection doors to control the direction of said single thrust producing fluid stream.

15. The jet engine nozzle of claim 14 wherein each of said first and second deflection doors is an arcuate panel of a length substantially identical to the length of said tubular transverse memer and the chordal length of said arcuate panels is dimensioned such that said arcuate panel is fully retractable within said interior region of said tubular cross member.

16. The jet engine nozzle of claim 15 further comprising a trailing body having a generally wing-like shape, the forward edge of said trailing body pivotably connected within said rectangular opening formed by said intersection of said tubular cross member with said exit plane, said trailing body extending rearwardly from said exit plane, the upper and lower forward surface of said trailing body respectively partitioning said rectangular opening into an upper and lower slot for deployment of said first and second deflection doors, said control means including means for rotating said trailing body such that the surface of said trailing body forms an extension of the surfaces of said differentially controlled deflection doors.

17. The jet engine nozzle of claim 15 wherein each of said first and second deflection doors includes a plurality of serially deployable panels, said plurality of serially deployable panels nesting one upon another when said first and second deflection doors are retracted within said interior region of said tubular cross member, said plurality of serially deployable panels of said first and second deflection doors respectively extendable into said first and second fluid streams.

* * * * *